(12) United States Patent
Betts et al.

(10) Patent No.: US 6,993,067 B1
(45) Date of Patent: Jan. 31, 2006

(54) FRACTIONAL BIT RATE ENCODING IN A PULSE AMPLITUDE MODULATION COMMUNICATION SYSTEM

(75) Inventors: William L. Betts, Petersburg, FL (US); Kenneth D. Ko, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 840 days.

(21) Appl. No.: 09/780,547

(22) Filed: Feb. 9, 2001

Related U.S. Application Data

(60) Provisional application No. 60/182,071, filed on Feb. 11, 2000.

(51) Int. Cl.
*H03K 11/00* (2006.01)

(52) U.S. Cl. ............... 375/214; 375/241; 375/242; 375/265; 375/353

(58) Field of Classification Search ............... 375/219, 375/353, 242, 298, 222, 261, 295, 286, 262, 375/265, 341, 227, 241; 714/792, 704, 789, 714/790; 341/61; 370/419, 466, 497
See application file for complete search history.

(56) References Cited

U.S. PATENT DOCUMENTS

| | | | | |
|---|---|---|---|---|
| 5,103,227 A | | 4/1992 | Betts ........................... 341/61 |
| 5,233,629 A | * | 8/1993 | Paik et al. ................... 375/262 |
| 5,251,236 A | * | 10/1993 | Brehmer et al. ............ 375/298 |
| 5,684,834 A | * | 11/1997 | Betts et al. .................. 375/298 |
| 5,706,312 A | * | 1/1998 | Wei ............................. 375/298 |
| 5,822,371 A | * | 10/1998 | Goldstein et al. ........... 375/242 |
| 5,859,877 A | * | 1/1999 | Betts et al. .................. 375/298 |
| 5,875,229 A | * | 2/1999 | Eyuboglu et al. .......... 379/1.04 |
| 6,137,829 A | * | 10/2000 | Betts .......................... 375/222 |
| 6,233,712 B1 | * | 5/2001 | Rhee et al. .................. 714/789 |
| 6,606,355 B1 | * | 8/2003 | Wei ............................. 375/242 |

OTHER PUBLICATIONS

ITU-Telecommunication Standardization Sector, G.shdsl: Draft Recommendation for (G.991.2) G.shdsl, Fiji Island, Jan. 31-Feb. 4, 2000; pp. 1-149.
ITU-Telecommunication Standardization Sector, G.991.2 (ex G.shdsl): Fractional bit mapping, No. D.727(WP1/15), Geneva, Apr. 3-14, 2000; 5 pages.
ITU-Telecommunications Standardization Sector, G.shdsl: Performance of Generalized and Fractional PAM Mappings, Antwerp, Belgium Jun. 19-23, 2000, pp. 1-6.

(Continued)

*Primary Examiner*—Stephen Chin
*Assistant Examiner*—Ted Wang
(74) *Attorney, Agent, or Firm*—Thomas, Kayden, Horstemeyer & Risley, LLP

(57) ABSTRACT

Fractional bit rate encoding in a pulse amplitude modulation (PAM) communication environment allows the transmission of fractional bit rates, thus maximizing the use of signal-to-noise ratio (SNR) available on a communication channel. The invention allows the transmission of fractional bit rates in a PAM transceiver, thus allowing the encoding and transmission of a fractional number of bits on each PAM transmit symbol. By encoding a non-integer number of bits, a non power-of-two number of PAM levels can be encoded.

33 Claims, 4 Drawing Sheets

OTHER PUBLICATIONS

U.S. Utility Application entitled Fractional Bit Rate Encoding in a Discrete Multi-Tone Communication System; Unofficial U.S. Appl. No. (from Postcard) 09/717,436; Inventor: William L. Betts; filed Nov. 20, 2000.

"Enhancements to Recommendation V.90," International Telecommunication Union, Series V: Data Communication Over the Telephone Network, Simultaneous Transmission of Data and Other Signals, Nov. 2000.

"A Digital Modem and Analogue Modem Pair for Use on the Public Switched Telephone Network (PSTN) at Data Signaling Rates of up to 56 000 Bit/s Downstream and up to 33 600 Bit/s Upstream," International Telecommunication Union, Series V: Data Communication Over the Telephone Network, Simultaneous Transmission of Data and Other Signals, Sep. 1998.

* cited by examiner

FRACTIONAL BIT RATE ENCODING IN A PULSE AMPLITUDE MODULATION COMMUNICATION SYSTEM

CROSS-REFERENCE TO RELATED APPLICATIONS

This document claims priority to and the benefit of the filing date of Provisional Application Ser. No. 60/182,071 entitled MODULUS CONVERSION MAPPING, filed Feb. 11, 2000, which is hereby incorporated by reference.

TECHNICAL FIELD

The present invention relates generally to communications systems, and more particularly, to fractional bit rate encoding in a pulse amplitude modulation (PAM) communications system.

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem." Today, the term modem is typically used to denote any piece of communication apparatus that enables the transfer of data and voice information from one location to another. For example, modem communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office to the user, or remote location, typically referred to as the customer premises (CP). Various DSL communication devices use different formats and different types of modulation schemes and achieve widely varying communication rates. However, even the slowest DSL communications devices achieve data rates far in excess of conventional point-to-point modems.

Some of the available modulation schemes include pulse amplitude modulation (PAM), quadrature-amplitude modulation (QAM), and carrierless amplitude/phase (CAP). In a PAM communication system, information in the form of an n-bit word is encoded to a number of voltage levels. The voltage levels are selected so that the encoded bits can be decoded at a receiving device. This process is sometimes referred to as "mapping." The PAM voltage levels correspond to the bits of information to be transmitted and the bits are encoded into a signal constellation. The transmit signal is transmitted to a receiving device. The receiving device analyzes the received waveform and attempts to decode the waveform to recover the encoded bits.

In a conventional PAM transmitter, as defined in the ITU-T draft recommendation G.991.2 (G.shds1), incorporated herein by reference, a PAM system having 16 levels is defined. Alternatively, $2^K$ levels, in which K represents the number of encoded bits and is an integer, are possible. Changing the number of encoded bits (K) results in undesirably large (on the order of 6 dB) performance degradation. Such a large performance degradation indicates that the PAM transmitter may be operating up to 6 dB below channel capacity.

Thus, it would be desirable to have a PAM communication system capable of using most or all of the available channel capacity.

SUMMARY

The invention is an improved system for communicating over a communications channel. The invention allows the transmission of fractional bit rates in a PAM transceiver, thus maximizing the use of signal-to-noise ratio (SNR) available on the communication channel and allowing the encoding and transmission of a fractional number of bits on each PAM transmit symbol. By encoding a non-integer number of bits, a non power-of-two number of PAM levels can be encoded.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Although described with particular reference to a single pair high speed digital subscriber line (SHDSL) communication system, the fractional bit rate encoding for PAM can be implemented in any single carrier or carrierless communication system.

Furthermore, the fractional bit rate encoding for PAM can be implemented in software, hardware, or a combination thereof. In a preferred embodiment(s), selected portions of the fractional bit rate encoding for PAM are implemented in hardware and software. The hardware portion of the invention can be implemented using specialized hardware logic. The software portion can be stored in a memory and can be executed by a suitable instruction execution system (microprocessor). The hardware implementation of the fractional bit rate encoding for PAM can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc.

Furthermore, the fractional bit rate encoding for PAM software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include the following: an electrical connection (electronic) having one or more wires, a portable computer diskette (magnetic), a random access memory (RAM), a read-only memory (ROM), an erasable programmable read-only memory (EPROM or Flash memory) (magnetic or electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
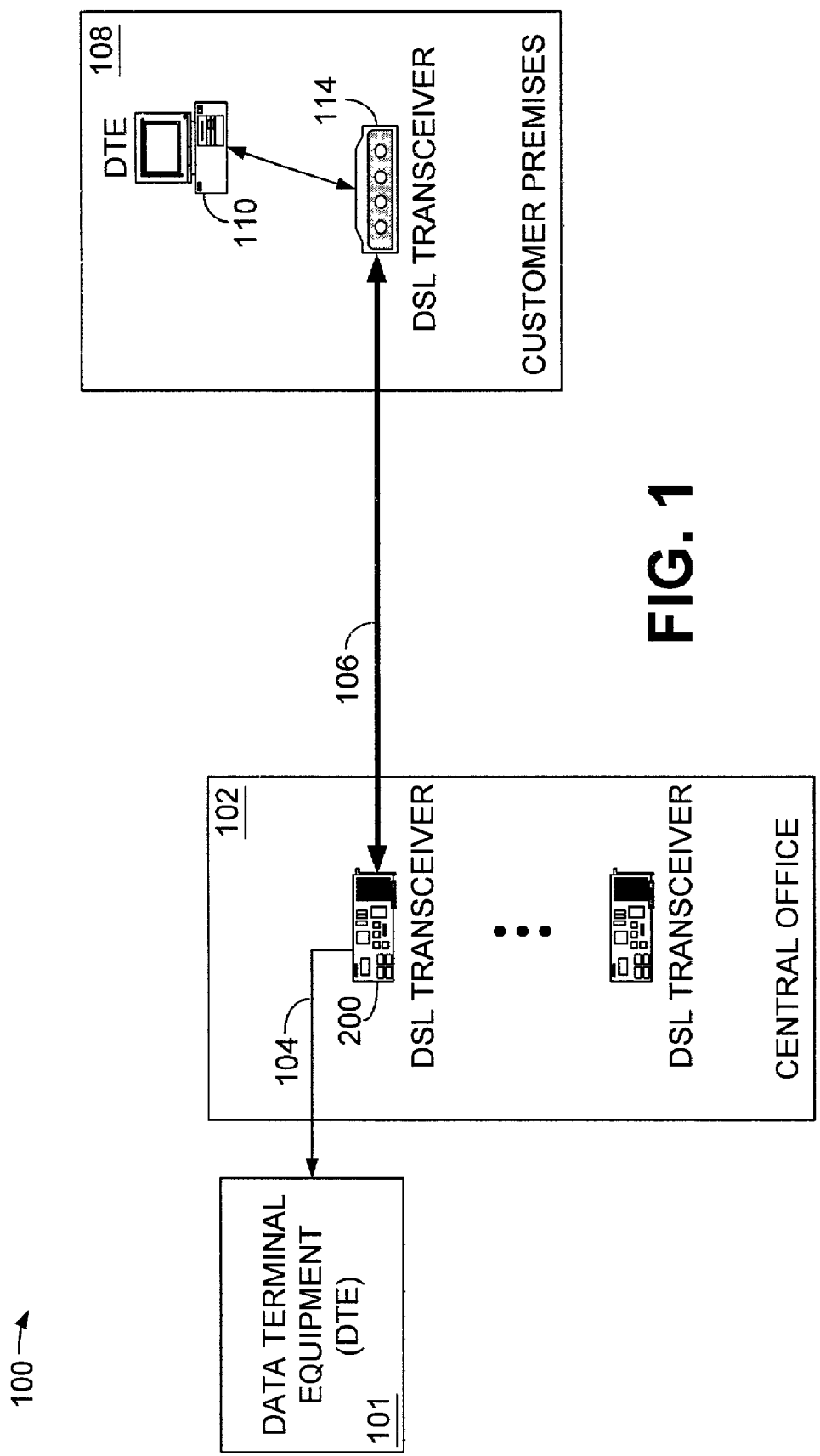
FIG. 1 is a block diagram illustrating the digital subscriber line (DSL) communication environment in which the present invention resides.

Turning now to the drawings, FIG. 1 is a block diagram illustrating the digital subscriber line (DSL) communication environment 100 in which the present invention resides. The DSL communication environment 100, for illustrative purposes only, is a single-pair high speed digital subscriber line (SHDSL) communication environment. However, other DSL communication environments are contemplated by the invention. For example, the invention contemplates the use of symmetric DSL technologies such as high bit rate DSL (HDSL), symmetric DSL (SDSL), and multi-rate SDSL (MSDSL). Furthermore, the invention contemplates other asymmetric digital subscriber line technology such as rate adaptive DSL (RADSL).

Central office 102 connects to customer premises 108 via communication channel 106. Communication channel 106 can be the copper wire pair that typically extends between central office 102 and a remote customer location, and is commonly referred to as the "local loop," or "subscriber loop." For exemplar purposes only, the transmission scheme between central office 102 and customer premises 108 is point-to-point fill duplex SHDSL, using pulse amplitude modulation (PAM) line coding. Other communication schemes are possible between central office 102 and customer premises 108, such as variations of multi-point and half duplex.

Central office 102 includes a number of DSL transceivers, an exemplar of one of which is illustrated using reference numeral 200. DSL transceiver 200 exchanges information with data terminal equipment 101 via connection 104 and interfaces to communication channel 106 in order to communicate with DSL transceiver 114 located at customer premises 108. DTE 101 can be, for example, a computer to which the DTE 110 in customer premises 108 is communicating, or can represent access to the Internet.

DSL transceiver 114 located at customer premises 108 connects to DTE 110 and communication channel 106. DTE 110 can be a personal computer. Typically, the DSL transceiver 114 is located in a home or office, and is used to allow data communication between DTE 110 and DTE 101.

DSL transceiver 114 communicates over communication channel 106 with DSL transceiver 200 in order to exchange data information. Data is exchanged between customer premises 108 and central office 102 in order to allow DTE 110 to access, for example, DTE 101, which may be an Internet access device provided by an Internet service provider (ISP). In some variations of DSL communication, voice information can be simultaneously exchanged with the data over communication channel 106.

Although illustrated using a single customer premises 108 connected to central office 102, typically a number of customer premises locations will be connected to one central office 102 using a plurality of communication channels. Furthermore, it is also possible for a number of customer premises locations to be connected to one DSL transceiver located at a central office. However, for purposes of explanation, the invention will be described with reference to a single customer premises 108 communicating with a single DSL transceiver 200 located at central office 102. Furthermore, the invention described hereafter is embodied in both DSL transceiver 200 located at central office 102 and in DSL transceiver 114 located at customer premises 108. However, for ease of illustration, only a single DSL transceiver 200 will be described below.

Figure 2:
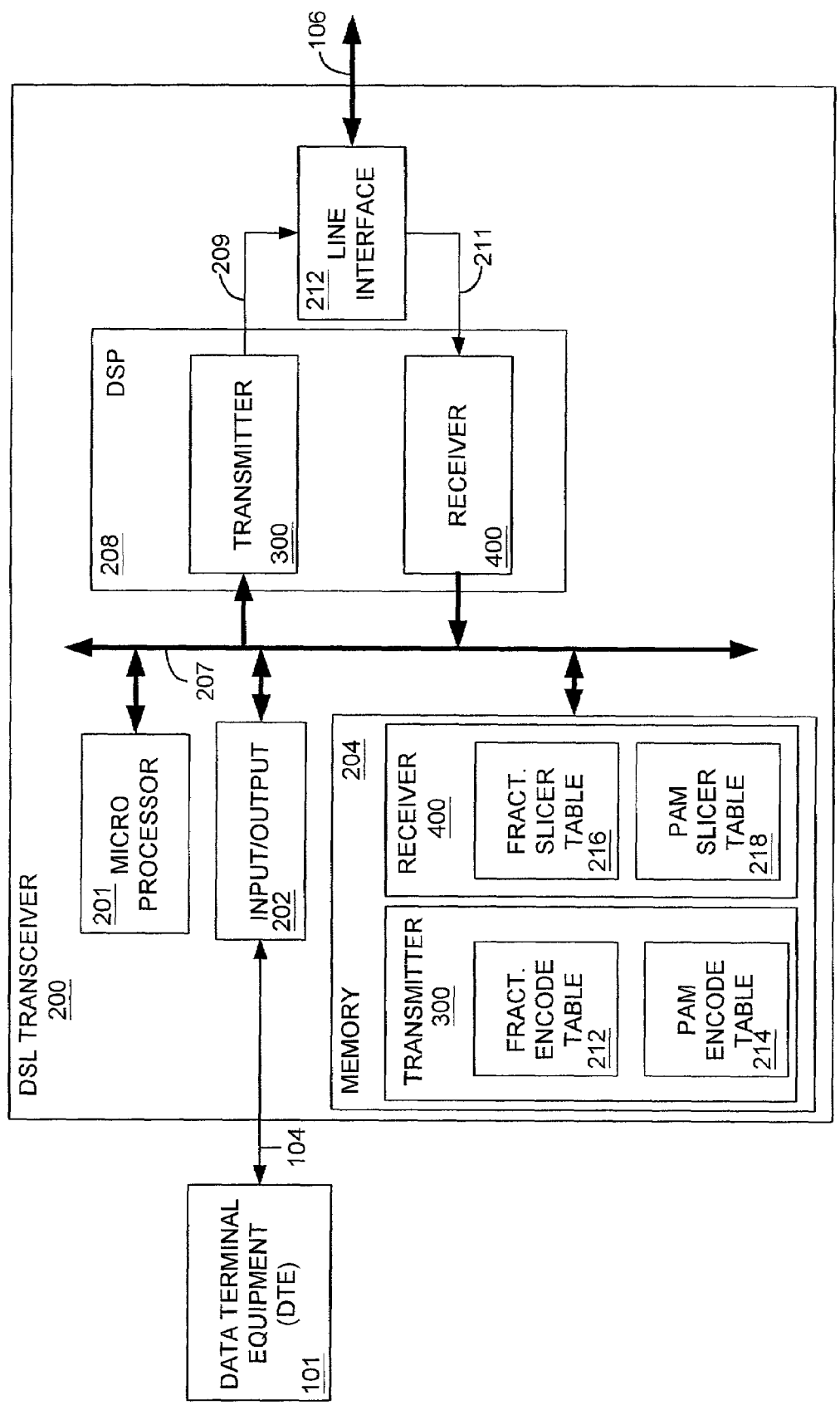
FIG. 2 is a block diagram illustrating the DSL transceiver of FIG. 1.

FIG. 2 is a block diagram illustrating the DSL transceiver 200 of FIG. 1. The DSL transceiver 200 communicates with DTE 101 via connection 104 where data supplied to and received from DTE 101 is exchanged via input/output element 202 within DSL transceiver 200. DSL transceiver 200 also includes microprocessor 201 and memory 204 in communication via bus 207 with digital signal processor (DSP) 208. The memory 204 and the microprocessor 201 work in cooperation to store and execute the logic of the invention. Although DSP 208 as illustrated includes the transmitter 300 and receiver 400 of the invention, the transmitter 300 and receiver 400 may be implemented separately. Furthermore, the transmitter 300 and receiver 400 are also shown as residing in memory 204 so that the functionality of the transmitter 300 and the functionality of the receiver 400 may be stored as program code in the memory and executed by the microprocessor 201 or the DSP 208.

Memory 204 includes fractional encoder table 212 and PAM encoder table 214 and includes fractional decoder (slicer) table 216 and PAM decoder (slicer) table 218. The tables 212, 214, 216 and 218 illustrate one possible manner of implementing the fractional bit rate encoding to be described below. Other implementations are possible, such as, for example but not limited to, using numerical calculations as described in commonly owned U.S. Pat. No. 5,103,227 entitled "MODULUS CONVERTER FOR FRACTIONAL RATE ENCODING," issued on Apr. 7, 1992 to Betts.

Transmitter 300, shown illustratively in DSP 208, communicates via connection 209 with line interface 212 to gain access to communication channel 106. Similarly, receiver 400, shown illustratively in DSP 208, receives signals from line interface 212 via connection 211. As will be described below, the transmitter 300 and receiver 400 each include the logic to enable the DSL transceiver 200 to communicate using fractional bit rates.

Figure 3:
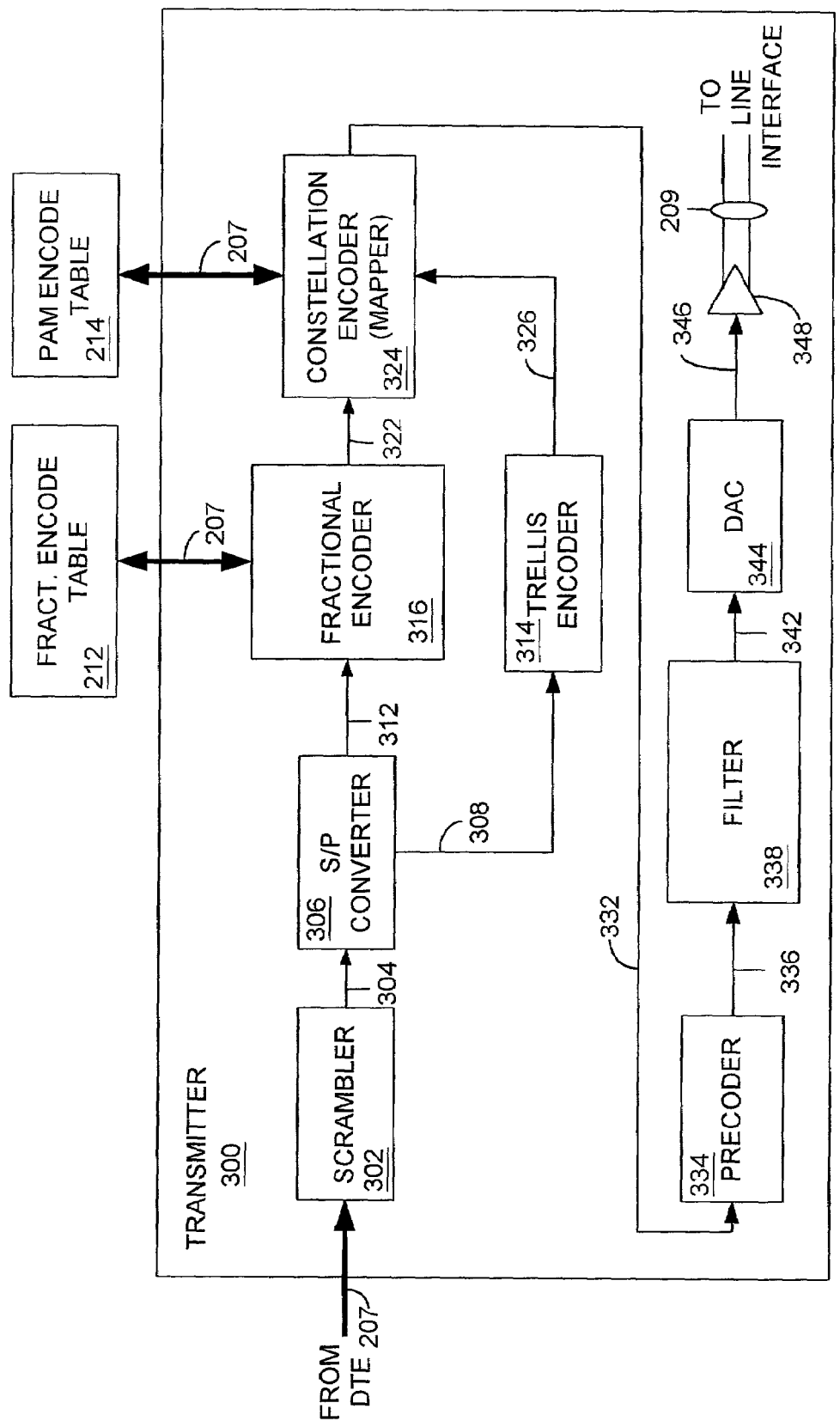
FIG. 3 is a block diagram illustrating the transmitter of FIG. 2.

FIG. 3 is a block diagram illustrating the transmitter 300 of FIG. 2. A data signal originating in DTE 101 is communicated via bus 207 to scrambler 302. The signal on connection 207 is in the form of a serial bit stream and the scrambler 302 provides a scrambled serial bit stream on connection 304. The scrambler 302 can be either a self-synchronized scrambler or a preset free running scrambler as is known in the art. Depending upon the application, the preset scrambler may have some advantages, as in the case where Reed-Solomon coding is used. Reed-Solomon coding and interleaving is known in the art as a methodology for forward error correction and can optionally be implemented in transmitter 300.

The scrambler 302 provides a scrambled K bit word on connection 304 to a serial-to-parallel converter 306. The serial-to-parallel converter 306 converts the serial bit stream on connection 304 to a K-bit parallel word having the form $\{X_1(m)=s(mK+0), X_2(m)=s(mK+1), \ldots, X_k(m)=s(mK+K-1)\}$ at the $m^{th}$ symbol time, where $X_1(m)$ is the first in time. The serial-to-parallel converter 306 supplies the higher order bits on connection 312 in the form of a (K-1) bit word to the fractional encoder 316. The serial-to-parallel converter 306 supplies the least significant bit (LSB) on connection 308 to the trellis encoder 314. The least significant bit on connection 308 represents one bit $X_1(m)$ for trellis encoding. The trellis encoder 314 performs convolutional encoding on the LSB on connection 308 and supplies two trellis bits $Y_0(m)$ and $Y_1(m)$ on connection 326 to the constellation encoder 324, sometimes referred to as a "mapper." The trellis bits on connection 326 bypass the fractional encoder 316.

The K-1 bit parallel words output from the serial-to-parallel converter 306 on connection 312 are supplied to the fractional encoder 316. The fractional encoder 316 includes the logic for fractionally encoding (by encoding a non-integer number of bits on each PAM transmit symbol) the (K-1) bit parallel words on connection 312.

There are several possible ways to implement the fractional encoder 316 to encode fractional bit rates. One manner is shell mapping. Shell mapping increases peak power to achieve shaping gain. While shell mapping increases peak power, the higher level signal points occur less frequently when shaping gain is employed. This is so because the transmit energy is typically concentrated in the central points of the signal space constellation. Another manner for encoding fractional bit rates is constellation switching, which alternates between constellations of B or B+1 bits to achieve the fractional bit encoding. Unfortunately, constellation switching also increases the peak power due to the occasional transmission of the larger B+1 bit constellation.

Another manner for implementing fractional encoding is modulus conversion, an example of which is described in commonly owned U.S. Pat. No. 5,103,227, incorporated into this document by reference. Modulus conversion achieves fractional bit rates by converting the incoming bit stream on connection 312 to symbols having an arithmetic base or modulus equal to the size of the constellation. Fractional bits are transmitted when the number of points in the constellation is not a power of 2. The modulus or constellation size is computed by $M_i=2^K$ and $K=(SNR_i-Q)/6$, where $M_i$ is the modulus, K is the number of bits transmitted, $SNR_i$ is the signal-to-noise ratio of the channel and Q is the margin required for the decoder in the receiver. In accordance with an aspect of the invention, K may be a fractional value. By allowing a non-integer number of bits K to be transmitted on each PAM symbol (equivalent to one PAM pulse) a non power-of-two number of PAM levels can be encoded.

In conventional PAM, K is always an integer. The modulus converter operates by collecting an integer number of bits S*K, where "*" denotes multiplication, over a frame comprising several symbol periods S. The bits are collected over connection 312 in sets of K or (K+1) bits. The frame of S*K bits is then encoded for transmission at a fractional bit rate of K bits per symbol. For PAM the minimum number of levels is $2^K$. With one bit $X_1(m)$ encoded by the trellis encoder, the (K-1) bits are fractionally encoded each symbol time. The trellis encoder will generate 2-bits or four levels. Thus, the total number of coded levels is $4*2^{(K-)}$.

The modulus converter converts a frame of S*K bits into S symbols of M levels each. The trellis encoder 314 doubles the number of levels to 2M. The modulus M is the smallest integer such that $M>=2^K$. This assures that the information capacity of the modulated symbols is sufficient, $Ms>=2 S*K$. The modulus conversion is an arithmetic base conversion. The S*K bits of the frame in binary are converted to S integers, each of arithmetic base M. The conversion process is division by the modulus. The remainders in each division step are the modulus-converted integers that will be transmitted. The remainders have integer values between 0 and M-1, and are encoded as one of M levels. The M levels are normalized to ±1/M exactly as is done for 16-PAM normalization of ±1/16.

Alternatively, the fractional encoder 316 performs the fractional bit rate encoding by communicating via connection 207 with memory 204 (FIG. 2), which contains the fractional encoder table 212 (shown below in Table 1).

In accordance with an aspect of the invention, two constellations are added to the generalized mapping shown in the G.991.2 recommendation mentioned above. Constellation sizes of 12 and 24 levels can be used to map fractional bit rates of 3.5 or 4.5 bits per symbol corresponding to 2.5 or 3.5 user data bits per symbol. The trellis encoder 314 encodes one of the data bits each symbol period, $X_1(m)$ and $X_1(m+1)$. 1.5 or 2.5 bits per symbol are modulus converted in the fractional encoder 316 in accordance with the fractional encoder table 212 (FIG. 2) shown in Table 1.

TABLE 1

| Bits per Symbol = | 1.5 | | | 2.5 | | |
| Modulus = | 3 | | | 6 | | |
| Input | | C (m) | C (m + 1) | | C (m) | C (m + 1) |
| 0 | | 0 | 0 | | 0 | 0 |
| 1 | | 1 | 0 | 1 | 1 | 0 | 1 |
| 2 | | 2 | 0 | 2 | 2 | 0 | 2 |
| 3 | | 10 | 1 | 0 | 3 | 0 | 3 |
| 4 | | 11 | 1 | 1 | 4 | 0 | 4 |
| 5 | | 12 | 1 | 2 | 5 | 0 | 5 |
| 6 | | 20 | 2 | 0 | 10 | 1 | 0 |
| 7 | | 21 | 2 | 1 | 11 | 1 | 1 |
| 8 | | | | | 12 | 1 | 2 |
| 9 | | | | | 13 | 1 | 3 |
| 10 | | | | | 14 | 1 | 4 |
| 11 | | | | | 15 | 1 | 5 |
| 12 | | | | | 20 | 2 | 0 |
| 13 | | | | | 21 | 2 | 1 |
| 14 | | | | | 22 | 2 | 2 |
| 15 | | | | | 23 | 2 | 3 |
| 16 | | | | | 24 | 2 | 4 |
| 17 | | | | | 25 | 2 | 5 |
| 18 | | | | | 30 | 3 | 0 |
| 19 | | | | | 31 | 3 | 1 |
| 20 | | | | | 32 | 3 | 2 |
| 21 | | | | | 33 | 3 | 3 |
| 22 | | | | | 34 | 3 | 4 |
| 23 | | | | | 35 | 3 | 5 |
| 24 | | | | | 40 | 4 | 0 |
| 25 | | | | | 41 | 4 | 1 |
| 26 | | | | | 42 | 4 | 2 |
| 27 | | | | | 43 | 4 | 3 |
| 28 | | | | | 44 | 4 | 4 |
| 29 | | | | | 45 | 4 | 5 |
| 30 | | | | | 50 | 5 | 0 |
| 31 | | | | | 51 | 5 | 1 |

The most significant three or five bits of X(m) and X(m+1) are retained over a two symbol period in the serial-to-parallel converter 306 for input to the fractional encoder 316. The fractional encoder 316 generates two output symbols C(m) and C(m+1) on connection 322 for mapping to PAM levels in the constellation encoder (mapper) 324. The conversion table for C(m) and C(m+1) is stored in the memory 204 (FIG. 2) as the fractional encoder table 212 and is shown in Table 1. The combinations C(m)=C(m+1)=2 for 12-PAM and C(m)=C(m+1)=5 for 24-PAM are reserved to identify symbol alignment at the decoder.

The input index to the table is:
Input=$X_3(m+1)2^2+X_2(m+1)2+X_2(m)$ for 12-PAM or
Input=$X_4(m+1)2^4+X_3(m+1)23+X_2(m+1)2^2+X_3(m)2^1+X_2(m)$ for 24-PAM.

Optional 12-PAM and 24-PAM mappings encode fractional bits by encoding K-1 bits on even frames (m) and K bits on odd frames, (m+1).

The two output symbols C(m) and C(m+1) on connection 322 are supplied to the constellation encoder 324. The constellation encoder 324 communicates over connection 207 with the PAM encoder table 214 (FIG. 2) shown below in Table 2. The PAM encoder table 214 contains the PAM level mappings applied to the modulus converted symbols on connection 322 and the trellis bits on connection 326. The index into the PAM encoder table 214 for the first symbol period uses modulus converted symbol C(m) along with the trellis bits $Y_0(m)$ and $Y_1(m)$. The index into the PAM encoder table 214 for the second symbol period uses modulus converted symbol C(m+1) along with the trellis bits $Y_0(m+1)$ and $Y_1(m+1)$.

Although generally recognized as a single dimensional encoding methodology, multiple dimensions can be encoded using PAM. Multi-dimensional constellations can be implemented in PAM by transmitting one dimension in each PAM symbol over a frame of S PAM symbols. In this view, the fractional encoder is multi-dimensional. Multiple dimensions are frequently used for trellis codes. Two or four dimension trellis codes require only ½ or ¼ bit redundancy respectively, instead of the full bit redundancy of one dimension trellis codes. The fractional encoder 316 enables the use of multi-dimensional trellis codes and other multi-dimensional applications.

As known to those having ordinary skill in the art, the Gray coded upper bits are not used for 12-PAM or 24-PAM. The fractional encoder 316 encodes the (K−1) most significant bits on connection 312. With non-fractional encoding the (K−1) most significant bits may use Gray encoding, which minimizes the number of bit errors in the receiver when a symbol error occurs. With a trellis-coded system the Gray code has little significance. Note that the 12-PAM and 24-PAM mappings are constructed to maintain the same convolutional (trellis) code while avoiding a bias in positive or negative levels.

TABLE 2

| $Y_4$ | $Y_3$ | $Y_2$ | $Y_1$ | $Y_0$ | C (m) | Z (m) | 32-PAM (5 Bits) | 24-PAM (4.5 Bits) | 16-PAM (4 Bits) | 12-PAM (3.5 Bits) | 8-PAM (3 Bits) | 4-PAM (2 Bit) |
|---|---|---|---|---|---|---|---|---|---|---|---|---|
| 0 | 0 | 0 | 0 | 0 | 0 | 0 | −31/32 | 1/24 | −15/16 | −3/12 | −7/8 | −3/4 |
| 0 | 0 | 0 | 0 | 1 | 0 | 1 | −29/32 | 3/24 | −13/16 | −1/12 | −5/8 | −1/4 |
| 0 | 0 | 0 | 1 | 0 | 0 | 2 | −27/32 | −3/24 | −11/16 | 1/12 | −3/8 | 1/4 |
| 0 | 0 | 0 | 1 | 1 | 0 | 3 | −25/32 | −1/24 | −9/16 | 3/12 | −1/8 | 3/4 |
| 0 | 0 | 1 | 0 | 0 | 1 | 4 | −23/32 | −7/24 | −7/16 | 5/12 | 1/8 | — |
| 0 | 0 | 1 | 0 | 1 | 1 | 5 | −21/32 | −5/24 | −5/16 | 7/12 | 3/8 | — |
| 0 | 0 | 1 | 1 | 0 | 1 | 6 | −19/32 | 5/24 | −3/16 | −7/12 | 5/8 | — |
| 0 | 0 | 1 | 1 | 1 | 1 | 7 | −17/32 | 7/24 | −1/16 | −5/12 | 7/8 | — |
| 0 | 1 | 1 | 0 | 0 | 2 | 8 | −15/32 | 9/24 | 1/16 | −11/12 | — | — |
| 0 | 1 | 1 | 0 | 1 | 2 | 9 | −13/32 | 11/24 | 3/16 | −9/12 | — | — |
| 0 | 1 | 1 | 1 | 0 | 2 | 10 | −11/32 | −11/24 | 5/16 | 9/12 | — | — |
| 0 | 1 | 1 | 1 | 1 | 2 | 11 | −9/32 | −9/24 | 7/16 | 11/12 | — | — |
| 0 | 1 | 0 | 0 | 0 | 3 | 12 | −7/32 | −15/24 | 9/16 | | — | — |
| 0 | 1 | 0 | 0 | 1 | 3 | 13 | −5/32 | −13/24 | 11/16 | | — | — |
| 0 | 1 | 0 | 1 | 0 | 3 | 14 | −3/32 | 13/24 | 13/16 | | — | — |
| 0 | 1 | 0 | 1 | 1 | 3 | 15 | −1/32 | 15/24 | 15/16 | | — | — |
| 1 | 1 | 0 | 0 | 0 | 4 | 16 | 1/32 | 17/24 | — | | — | — |
| 1 | 1 | 0 | 0 | 1 | 4 | 17 | 3/32 | 19/24 | — | | — | — |
| 1 | 1 | 0 | 1 | 0 | 4 | 18 | 5/32 | −19/24 | — | | — | — |
| 1 | 1 | 0 | 1 | 1 | 4 | 19 | 7/32 | −17/24 | — | | — | — |
| 1 | 1 | 1 | 0 | 0 | 5 | 20 | 9/32 | −23/24 | — | | — | — |
| 1 | 1 | 1 | 0 | 1 | 5 | 21 | 11/32 | −21/24 | — | | — | — |
| 1 | 1 | 1 | 1 | 0 | 5 | 22 | 13/32 | 21/24 | — | | — | — |
| 1 | 1 | 1 | 1 | 1 | 5 | 23 | 15/32 | 23/24 | — | | — | — |
| 1 | 0 | 1 | 0 | 0 | | | 24 | 17/32 | — | | — | — |
| 1 | 0 | 1 | 0 | 1 | | | 25 | 19/32 | — | | — | — |
| 1 | 0 | 1 | 1 | 0 | | | 26 | 21/32 | — | | — | — |
| 1 | 0 | 1 | 1 | 1 | | | 27 | 23/32 | — | | — | — |
| 1 | 0 | 0 | 0 | 0 | | | 28 | 25/32 | — | | — | — |
| 1 | 0 | 0 | 0 | 1 | | | 29 | 27/32 | — | | — | — |
| 1 | 0 | 0 | 1 | 0 | | | 30 | 29/32 | — | | — | — |
| 1 | 0 | 0 | 1 | 1 | | | 31 | 31/32 | — | | — | — |

The K + 1 bits $Y_K(m)$ (corresponding to the bit $X_K(m)$), ..., $Y_1(m)$, and $Y_0(m)$ are mapped to a level x(m) as shown in Table 2.

Fractional encoding enables a flexible communication system that can operate at any data transmission rate. The constellation density, or number of PAM levels, can be adjusted to match the signal to noise ratio, SNR, of any channel. During start-up, the receiver measures the channel to determine the SNR. The receiver then computes the largest constellation consistent with the desired bit error rate at the measured SNR. At the end of initialization the receiver signals the transmitter and identifies the constellation size that the transmitter should use. An activation frame is sent identifying the constellation size, or PAM level mapping, and other parameters such as the convolutional encoder coefficients and precoder coefficients. The activation frame format is modified from that shown in ITU-T draft recommendation G.991.2 (G.shds1) and is shown in Table 3. The activation frame format identifies the PAM level mapping to be used.

TABLE 3

| Activation Frame Bit LSB:MSB | Definition |
| --- | --- |
| 1:14 | Frame Sync for $T_c$ and $T_r$: $11111001101011_2$, where the left-most bit is sent first in time<br>Frame Sync for $F_c$: $11010110011111_2$, where the left-most bit is sent first in time |
| 15:36 | Precoder Coefficient 1: 22 bit signed two's complement format with 17 bits after the binary point, where the LSB is sent first in time |
| 37:58 | Precoder Coefficient 2 |
| 59:3952 | Precoder Coefficients 3–179 |
| 3953:3974 | Precoder Coefficient 180 |
| 3975:3995 | Encoder Coefficient A: 21 bits where the LSB is sent first in time |
| 3996:4016 | Encoder Coefficient B: 21 bits where the LSB is sent first in time |
| 4017:4021 | PAM level mapping: 5-bits |
| 4022:4149 | Vendor Data: 128 bits of proprietary information |
| 4150:4211 | Reserved: 62 bits set to logical zeros |
| 4212:4227 | CRC: $c_1$ sent first in time, $c_{15}$ sent last in time |

Referring again to FIG. 3, the signal containing the encoded transmit symbol is supplied on connection 332 to the precoder 334. The precoder 334 comprises a filter (not shown, but preferably a finite impulse response (FIR) filter) and a modulo operator (not shown) and maintains the average power of the signal on connection 332 so that the signal power remains within a predefined envelope.

The precoded signal on connection 336 is then supplied to filter 338. The filter 338 exhibits different characteristics depending on the type of modulation being used. For example, when PAM is employed, the filter 338 may not be required or may be a low pass filter that filters the passband of the signal. Alternatively, when using CAP modulation, the filter 338 is a Hilbert filter configured to receive the X and Y coordinates of the signal constellation on connection 336 and perform CAP modulation to provide a bandpass output on connection 342 at a certain frequency range. Alternatively, the filter 338 could be a modulator that receives the output of the precoder 334 on connection 336 and modulates the signal using a technique such as coded or uncoded quadrature amplitude modulation (QAM), as is known in the art. The modulator provides the sine and cosine components of the carrier frequency, or the X and Y values of the carrier frequency, as is known in the art.

The signal on connection 342 is supplied to a digital-to-analog converter (DAC) 344. The DAC 344 converts the digital domain signals on connection 342 to analog domain signals on connection 346. The analog signal on connection 346 is amplified by differential transmit amplifier 348, which is the line driver for the transmitter 300, for transmission via connection 209 to the line interface 212 of FIG. 2 and for transmission via communication channel 106. DAC 344 may include a filter (not shown) to help control the power spectrum density (PSD) for spectrum management.

Figure 4:
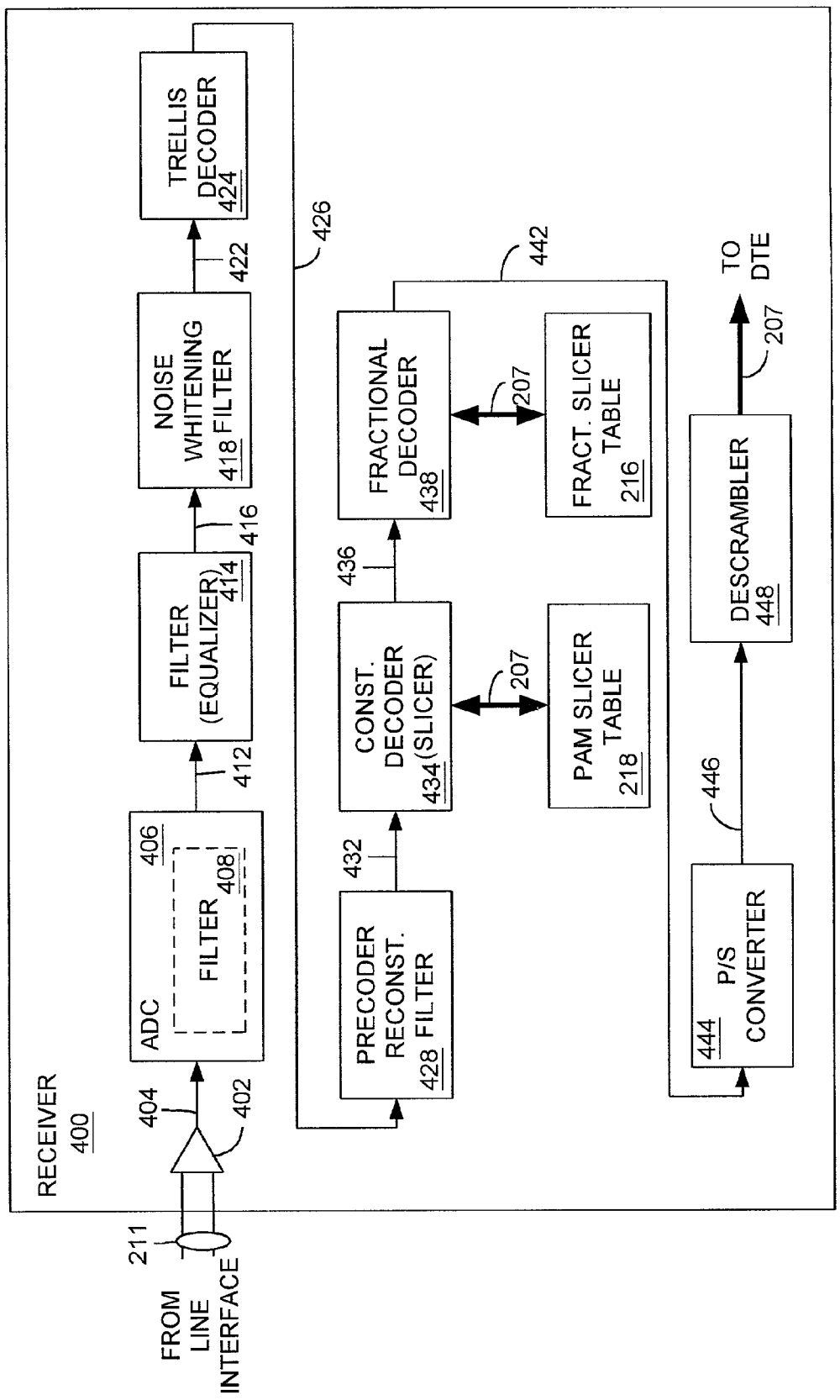
FIG. 4 is a block diagram illustrating the receiver of FIG. 2.

FIG. 4 is a block diagram illustrating the receiver 400 of FIG. 2. Although the transmitter 300 and receiver 400 are shown above in FIG. 2 as being located in the same transceiver, the following discussion will assume that the receiver 400 is in DSL transceiver 200 and is remotely located from the transmitter 300 that is in DSL transceiver 114. A signal received on communication channel 106 (FIG. 2) is supplied via line interface 212 (FIG. 2) and via connection 211 to the differential amplifier 402. The receive signal is then supplied via connection 404 to the analog-to-digital converter (ADC) 406. The ADC 406 may include a filter 408 and/or an equalizer (not shown) to help control undesirable signals and intersymbol interference. ADC 406 converts the analog signal received on connection 211 into a serial bit stream of time domain samples that represent, on connection 412, the signal constellation encoded in the transmitter (FIG. 3).

The serial bit stream on connection 412 is supplied to filter 414. The filter 414 performs the reverse operation of the filter 338 of FIG. 3 by demodulating the serial bit stream on connection 412. For example, in the case of PAM, the filter 414 may not be required or may be a low pass filter that performs the opposite operation of the low pass filter 338 in FIG. 3. Alternatively, in the case of CAP modulation, the filter 414 is a Hilbert filter that performs the opposite operation of the passband Hilbert filter in FIG. 3. Further, the filter 414 could be a demodulator that receives the output of the ADC 406 on connection 412 and that demodulates the QAM modulated signal as is known in the art. The output of the filter 414 is a demodulated signal representing the encoded constellation point and is supplied over connection 416 to the noise whitening filter 418.

The noise whitening filter 418 performs the inverse operation of the precoder 334 (FIG. 3) in order to provide the correct channel response on connection 422 to the trellis decoder 424. The noise-whitening filter 418 can be implemented within filter 414 but is preferably implemented independently as shown. The noise-whitening filter 418 allows for seamless updating of precoder coefficients during operation. The coefficients of the noise-whitening filter 418 in DSL transceiver 200 are identical to those of the precoder 334 in the remote transmitter 300 in DSL transceiver 114. The trellis decoder 424 decodes the trellis bits that are included in the serial bit stream on connection 422. The output of the trellis decoder is supplied on connection 426 to the precoder reconstruction filter 428.

The precoder reconstruction filter 428 removes the modulo operation applied by the precoder 334 in the transmitter 300 (FIG. 3) by using a modulo operation and optionally using a FIR filter (not shown) similar to those discussed in FIG. 3. The FIR filter is useful when shaped or shell mapped constellations are used to achieve lower average power. The output of the precoder reconstruction filter 428 on connection 432 is supplied to constellation decoder 434. Constellation decoder 434 operates in cooperation with the PAM slicer table 218 (FIG. 2) (which can be derived from the PAM encoder table 214 shown in Table 2) to recover the original encoded signal point by supplying an index representing the constellation point received for each symbol. For example, to slice a 12-PAM constellation, the voltage level values in Table 2, column "12-PAM" are reordered from −11/12 to +11/12 and the corresponding bit values for C(m), Z(m) and $Y_0$ through $Y_1$ are read out of the table.

The output of the constellation decoder 434 on connection 436 is supplied to fractional decoder 438. The fractional decoder 438 is preferably a modulus converter similar to that described above and converts the groups of indices, or words, into a new set of binary words, which are restored in their original order. The fractional decoder 438 performs the opposite operation of the fractional encoder 316 (FIG. 3) by using the fractional slicer table 216 (FIG. 2). The fractional slicer table can be derived from the fractional encoder table 212 shown in Table 1 in a similar manner to that described above for deriving the PAM slicer table 218. The fractional slicer table 216 (FIG. 2) allows the receiver 400 to recover the original fractionally encoded symbols by supplying an index representing the constellation point received for each fractionally encoded symbol.

The values of C(m) and C(m+1) are used to address the C(m) and C(m+1) columns of Table 1. Then the corresponding values of the decoded index are extracted from the first column (labeled "input") of Table 1. The index is an integer with binary bits corresponding to $Y_3(m+1)2^2+Y_2(m+1)2+Y_2(m)$. For example if C(m)=1 and C(m+1)=2, then the index=5, corresponding to $Y_3(m+1)=1$, $Y_2(m+1)=0$ and $Y_2(m)=1$. $Y_0$ and $Y_1$ are the trellis encoded bits and bits $Y_2$ through $Y_3$ are fractionally decoded. With C(m) and C(m+1) providing addresses, the inputs Y(m) and Y(m+1) will be recovered.

The output of the fractional decoder 438 is supplied via connection 442 to the parallel-to-serial converter 444, which may be implemented as a shift register. The serial bit stream on connection 446 is supplied to the descrambler 448. The descrambler 448 descrambles the signal to recover the original bit stream on connection 207, and supplies this stream through the input/output element 202 (FIG. 2) to the DTE 101.

In one implementation, the fractional rate encoding system described herein achieves a 2.5 dB step in performance for a ½ bit change in the bits transmitted per symbol, providing a 2.5 dB performance improvement.

While various embodiments of the invention have been described, it will be apparent to those of ordinary skill in the art that many more embodiments and implementations are possible that are within the scope of this invention.

What is claimed is:

1. A transmitter, comprising:
   a pulse amplitude modulation (PAM) transmitter configured to transmit a point on a signal space constellation, the point representing at least one word;
   a trellis encoder associated with the PAM transmitter configured to generate a convolutional code based upon at least one bit of each word;
   a fractional encoder associated with the PAM transmitter, the fractional encoder configured to encode a non-integer number of bits for each word to produce an output symbol; and
   a constellation encoder configured to map the point on the signal space constellation based upon the output symbol and the convolutional code, the sign of the point being selected by the convolutional code to avoid a bias in positive or negative levels.

2. The transmitter of claim 1, wherein the fractional encoder is configured to collect an integer number of bits S*K, over a frame comprising several symbol periods S, and convert the S*K bits of the frame into S integers, each of arithmetic base M, where M corresponds to a plurality of PAM signal levels, said PAM signal levels increasing in direct proportion to the values of the S integers.

3. The transmitter of claim 1, further including a non-fractional encoder associated with the PAM transmitter;
   wherein the constellation encoder is configured to map the point based on the same convolutional code generated by the trellis encoder when using the non-fractional encoder while avoiding a bias in the positive or negative level.

4. The transmitter of claim 1, wherein the trellis encoder generates the convolutional code based upon at least one bit of each word independent of the remaining bits of each word.

5. The transmitter of claim 1, wherein the at least one bit of each word used to generate the convolutional code bypasses the fractional encoder.

6. The transmitter of claim 1, wherein the trellis encoder is a feed-forward non-systematic convolutional encoder.

7. The transmitter of claim 1, further including a PAM encoder table in communication with the constellation encoder;
   wherein the constellation encoder is configured to encode the point based upon the PAM encoder table.

8. The transmitter of claim 1, further including a fractional encoder table in communication with the fractional encoder;
   wherein the fractional encoder is configured to encode the output symbol based on the fractional encoder table.

9. A transmitter, comprising:
   a pulse amplitude modulation (PAM) transmitter configured to transmit a point on a signal space constellation, the point representing at least one word;
   a trellis encoder associated with the PAM transmitter configured to generate a convolutional code based upon at least one bit of each word;
   a fractional encoder associated with the PAM transmitter, the fractional encoder configured to encode a non-integer number of bits for each word to produce an output symbol; and
   a constellation encoder configured to map the point on the signal space constellation based upon the output symbol and the convolutional code, such that the mapping maintains the same convolutional code while avoiding a bias in positive or negative levels,
   wherein the signal space constellation comprises N signal levels, the output symbol is represented by C(m), and the level of the point generated by said constellation encoder is selected by the convolutional code from:
   −(4C(m)+1)/N or −(4C(m)+3)/N for negative levels;
   and from:
   (4C(m)+1)/N or (4C(m)+3)/N for positive levels.

10. The transmitter of claim 1, wherein the fractional encoder is a modulus converter.

11. The transmitter of claim 1, wherein the fractional encoder is configured to collect an integer number of bits S*K, over a frame comprising several symbol periods S, and is configured to encode the frame of S*K bits for transmission at a fractional bit rate of K bits per symbol.

12. The transmitter of claim 11, wherein the fractional encoder is configured to convert the S*K bits of the frame into S integers, each of arithmetic base M, where M corresponds to a plurality of PAM signal levels.

13. A method for encoding fractional bit rates using pulse amplitude modulation (PAM), the method comprising the steps of:
   using a PAM modulator to generate a point on an signal space constellation, the point representing at least one word;

generating a convolutional code based upon at least one bit of each word;

encoding a non-integer number of bits for each word to produce an output symbol; and mapping the point on the signal space constellation based upon the output symbol and the convolutional code, the sign of the point being selected by the convolutional code to avoid a bias in positive or negative levels.

14. The method of claim 13, further including:

collecting an integer number of bits S*K, over a frame comprising several symbol periods S, and converting the S*K bits of the frame into S integers, each of arithmetic base M, where M corresponds to a plurality of PAM signal levels, said PAM signal levels increasing in direct proportion to the values of the S integers.

15. The method of claim 13, further including:

mapping the point based on the same convolutional code generated by the trellis encoder when using a non-fractional encoder, while avoiding a bias in the positive or negative level.

16. The method of claim 13, wherein the step of generating a convolutional code based upon at least one bit of each word further comprises generating the convolutional code independent of the remaining bits of each word.

17. The method of claim 13, wherein the step of mapping the point on the signal space constellation further includes encoding the point based upon a PAM encoder table.

18. The method of claim 13, wherein the step of encoding a non-integer number of bits for each word to produce the output symbol further includes encoding the output symbol based on a fractional encoder table.

19. The method of claim 13, wherein the signal space constellation comprises N signal levels, the output symbol is represented by C(m), and the step of mapping the point on the signal space constellation further includes:

generating the level of the point, the level selected by the convolutional code from:

$-(4C(m)+1)/N$ or $-(4C(m)+3)/N$ for negative levels; and from:

$(4C(m)+1)/N$ or $(4C(m)+3)/N$ for positive levels.

20. The method of claim 13, further comprising:

decoding a received symbol into a non-integer number of bits.

21. The method of claim 13, wherein the encoding step includes modulus conversion.

22. The method of claim 13, further comprising the steps of:

collecting an integer number of bits S*K, over a frame comprising several symbol periods S; and encoding the frame of S*K bits for transmission at a fractional bit rate of K bits per symbol.

23. The method of claim 22, further comprising the step of converting the S*K bits of the frame into S integers, each of arithmetic base M, where M corresponds to a plurality of PAM signal levels.

24. A transmitter, comprising:

a pulse amplitude modulation (PAM) transmitter configured to transmit a point on a signal space constellation, the point representing at least one word;

a trellis encoder associated with the PAM transmitter configured to generate a convolutional code based upon at least one bit of each word;

a fractional encoder associated with the PAM transmitter, the fractional encoder configured to encode a non-integer number of bits for each word to produce an output symbol; and a constellation encoder configured to map the point on the signal space constellation based upon the output symbol and the convolutional code, the sign of the point being selected by the convolutional code.

25. The transmitter of claim 24, wherein the signal space constellation comprises N signal levels, the output symbol is represented by C(m), and the level of the point is selected by the convolutional code from $-4C(m)+1)/N$ or $-(4C(m)+3)/N$ for negative levels, and from $+(4C(m)+1)/N$ or $(4C(m)+3)/N$ for positive levels.

26. The transmitter of claim 24 further including a non-fractional encoder associated with the PAM transmitter;

wherein the constellation encoder is configured to map the point based on the same convolutional code generated by the trellis encoder when using the non-fractional encoder while avoiding a bias in the positive or negative level.

27. The transmitter of claim 24, wherein the fractional encoder is configured to collect an integer number of bits S*K, over a frame comprising several symbol periods S, and is configured to encode the frame of S*K bits for transmission at a fractional bit rate of K bits per symbol.

28. The transmitter of claim 24, wherein the trellis encoder generates the convolutional code based upon at least one bit of each word independent of the remaining bits of each word.

29. The transmitter of claim 24, wherein the at least one bit of each word used to generate the convolutional code bypasses the fractional encoder.

30. The transmitter of claim 24, wherein the trellis encoder is a feed-forward non-systematic convolutional encoder.

31. The transmitter of claim 24, further including a PAM encoder table in communication with the constellation encoder;

wherein the constellation encoder is configured to encode the point based upon the PAM encoder table.

32. The transmitter of claim 24, further including a fractional encoder table in communication with the fractional encoder;

wherein the fractional encoder is configured to encode the output symbol based on the fractional encoder table.

33. The transmitter of claim 24, wherein the fractional encoder is a modulus converter.

* * * * *

UNITED STATES PATENT AND TRADEMARK OFFICE
CERTIFICATE OF CORRECTION

PATENT NO. : 6,993,067 B1
DATED : January 31, 2006
INVENTOR(S) : Betts et al.

It is certified that error appears in the above-identified patent and that said Letters Patent is hereby corrected as shown below:

<u>Column 6,</u>
Line 4, delete "$4*2^{(K-)}$" and insert -- $4*2^{(K-1)}$ --.
Lines 9-10, delete "Ms>=2S*K" and insert -- $M^S >= 2^{S*K}$ --.

<u>Column 7,</u>
Line 15, delete "$X_3(m+1)23$" and insert -- $X_3(m+1)2^3$ --.

<u>Column 9,</u>
Line 15, delete "G.shds1" and insert -- G.shdsl --.

Signed and Sealed this

Twenty-third Day of May, 2006

JON W. DUDAS
*Director of the United States Patent and Trademark Office*